3,399,164
POLYMER DISPERSIONS
Desmond Wilfrid John Osmond, Windsor, England, assignor to Imperial Chemical Industries Limited, Millbank, London, England, a corporation of Great Britain
No Drawing. Filed June 8, 1966, Ser. No. 555,973
Claims priority, application Great Britain, Aug. 4, 1965, 33,357/65
3 Claims. (Cl. 260—33.6)

ABSTRACT OF THE DISCLOSURE

Process of making dispersions of polymers in organic liquids by polymerizing monomer in the liquid in the presence of seed particles of another polymer having a specified degree of insolubility in the organic liquid as determined by its swelling factor in the liquid under the conditions of the polymerization. The process is particularly suitable for making fine particle dispersions of substantially uniform particle size.

---

This invention relates to processes of dispersion polymerisation.

By "dispersion polymerisation" we mean polymerisation of monomers in an organic liquid in which the monomers are soluble but in which the resulting polymer is insoluble, the insoluble polymer so produced being stabilised in the form of disperse particles in the organic liquid by a stabiliser comprising an anchoring component which is associated with the surface of the particles and a pendent chain-like component which is solvated by the organic liquid and provides a stabilising sheath around the polymer particles. The solvated chain-like component may be a polymeric chain or a relatively shorter chain of as few as 12 or 15 co-valently linked atoms in length. In order to be solvated by the organic liquid, this component should be of a degree of polarity similar to that of the liquid. The anchoring component is relatively non-solvated and may be a polymer of nature similar to that of the dispersed polymer and associated therewith by the London interaction or it may be a component, polymeric or non-polymeric, containing polar or dipolar groups and associated with the dispersed polymer by specific interaction with complementary polar or dipolar groups therein. Such dispersion polymerisation processes are described in our Patent No. 3,095,388 and co-pending applications Ser. Nos. 290,243, 476,148, 476,201 and 525,315.

Generally, dispersion polymerisation takes place in two stages. The initial stage of the process involves simple solution polymerisation of monomer dissolved in the organic liquid. The insoluble polymer chains thus formed coil up and aggregate together to form particles which, when they have acquired a sheath of stabiliser, cease to grow by aggregation. With the appearance of this stabilised separate phase the polymerisation process enters its second stage in which monomer is adsorbed by and polymerised in association with the disperse polymer particles. It has been found that in many dispersion polymerisation processes relatively few new particles are formed during the second stage, most of the polymer being formed or deposited on the surface of existing particles which, in consequence, grow in size. This is so even when the major part of the polymerisation, i.e. from 75%–95%, takes place in the second stage.

A process of this type is very useful when, as usually is the case, it is desired to produce dispersions of polymer particles of substantially uniform size, i.e. dispersions in which substantially all of the particles are formed in the initial stage and then all grow at substantially the same rate during the second stage.

It will be appreciated, however, that in such cases the initial stage is critical in that the number and size of the particles formed in that stage determines the number and size of the particles in the final dispersion. If the dispersion is to be used, for example, in paint compositions where high polymer content, e.g. over 50% by weight, and fine particle size, e.g. less than $0.5\mu$, are desirable, it is essential that the initial seed particles be very finely divided.

One of the most important factors which determine initial particle size is the degree of insolubility of the polymer in the organic liquid; the greater the insolubility of the polymer chains the greater is their tendency, once formed in solution, to coil up and form aggregates and become surrounded by a sheath of stabiliser.

The degree of insolubility of the polymer in the organic liquid is in general determined by the difference in their polarities or by the degree of crosslinking or crystallinity of the polymer. For example, it is convenient to use in dispersion polymerisations, organic liquids which are non-polar, not only because the liquids used can be the cheap aliphatic and aliphatic/aromatic hydrocarbon fractions derived from petroleum, but also because many of the most useful polymers are relatively polar and so, being of opposite polarity to the hydrocarbons, are insoluble in such liquids. However, whilst polymers such as polymethyl methacrylate have such a degree of insolubility in the non-polar aliphatic hydrocarbon liquids that very fine stably-dispersed particles of the polymer can be formed in the initial stage of a dispersion polymerisation, others such as polyvinyl acetate, polyethyl acrylate and poly-$\beta$-ethoxyethyl methacrylate are of a borderline degree of insolubility and their polymer chains as formed in solution in the initial stage are reluctant to coil, aggregate and associate with stabiliser. The result is that an undesirable amount of polymer builds up in solution before initial precipitation occurs and any particles which are then formed are coarse.

We have now found, however, that once the organic liquid has been "seeded" with finely dispersed polymer particles, the second stage of a dispersion polymerisation of such polymers of borderline insolubility can be carried out.

The "seed" particles consist of polymer more insoluble in the organic liquid than the main polymer and may be, for example, particles of an entirely different polymer or particles of main polymer modified by a co-monomer which increases the difference in polarity between the disperse polymer and the organic liquid or particles of crosslinked polymer the crosslinking resulting from use of a polyfunctional monomer or co-monomer.

A suitable proportion of "seed" polymer is from 2% to 20% by weight of the total polymer of the dispersion and a suitable size of "seed" particle is from $0.05\mu$ to $0.5\mu$.

In the foregoing description reference has been made to the degree of insolubility of polymer in organic liquid and for the purpose of this invention a convenient measure of this degree of insolubility is the amount of organic liquid absorbed by the polymer in bulk when it is immersed in the organic liquid. Since the polymerisation is carried out in the presence of unreacted monomer dissolved in the organic liquid, measurement of polymer swelling for the purpose of this invention is carried out in a mixture of the organic liquid of the dispersion with 10% by weight of the monomer corresponding to the polymer, the mixture being maintained at the temperature at which the dispersion polymerisation is to be carried out and bulk polymer of the type to be dispersed being immersed therein until equilibrium is reached. The percentage increase in weight of the polymer in the equilibrium state under these conditions is hereinafter referred to as the swelling factor.

We have found that polymers which have a swelling factor of less than 15% and preferably not more than 10% can, when made by a dispersion polymerisation process, form stable dispersions of fine uniform particle size. As the swelling factor increases, i.e. as the polymer becomes less insoluble, it becomes more difficult to form fine particles in the initial stage of dispersion polymerisation of the polymer. This difficulty becomes acute when the swelling factor of the polymer exceeds 20% and when the swelling factor is over 25% the polymer is insufficiently insoluble in the organic liquid to produce a fine, uniform particle size dispersion by dispersion polymerisation in that organic liquid. We have found, however, that in the case of polymers whose swelling factor is as high as from 20% to 50%, satisfactory dispersions can be produced if there is used in the "seed" stage of the dispersion polymerisation, a polymer having a swelling factor of less than 15%, preferably not more than 10%.

It will be appreciated that polymers having swelling factors in the range 20% to 50% are of borderline insolubility as referred to above and that polymers in this range are those to which this invention may usefully be applied. In general, polymers having a swelling factor of more than 50% are unlikely to form fine, uniform dispersions by dispersion polymerisation even when a polymer of solubility factor less than 10% is used in the "seed" stage.

For example, in an aliphatic hydrocarbon liquid at say 80° C. polymethyl methacrylate has a swelling factor of about 10% and consequently dispersion polymerisation of methyl methacrylate at this temperature can result in dispersions of polymer particles of fine, uniform size. On the other hand, the swelling factor of polyethyl acrylate in aliphatic hydrocarbon at a similar temperature is in the range 20% to 50% and the dispersions resulting from dispersion polymerisation of ethyl acrylate in such a liquid are coarse. However, if there is used in the "seed" stage the more insoluble polymethyl methacrylate then polymerisation of ethyl acrylate onto such a "seed" can result in fine particle dispersions. In such dispersion polymerisations in aliphatic hydrocarbon a suitable stabiliser for the dispersed polymer particles would be a "backbone" of polymethyl methacrylate having attached thereto a number of chains of a self-ester of 12-hydroxystearic acid chains of number average molecular weight about 1500–1600, as described in co-pending application Ser. No. 476,201.

If the organic liquid of the dispersion is to be a mixture of aliphatic hydrocarbon with about 20% by weight of aromatic hydrocarbon then the swelling factor of polymethyl methacrylate in such a mixture at say 80° C. will have risen to above 15%. In consequence, in order to produce fine, uniform dispersion there should be used in the "seed" stage a more insoluble polymer, e.g. a copolymer of methyl methacrylate with a minor proportion of a co-monomer containing polar groups such as carboxyl, amide or nitrile. If, for example, methyl methacrylate is copolymerised with 5% methacrylic acid or with 10% acrylonitrile, such more polar copolymers have a swelling factor in the relatively non-polar aliphatic/aromatic mixture of less than 15%. In this case a suitable stabiliser for both the "seed" stage copolymer and the second stage homo-polymer will be one comprising a polymeric backbone of methyl methacrylate and a minor proportion of methacrylic acid to which are attached a number of chains of a self-ester of 12-hydroxystearic chains of number average molecular weight of 1500–1600 as described, for example, in the last-mentioned co-pending application.

As a further example, although polyvinyl acetate is sufficiently insoluble in aliphatic hydrocarbon at low temperatures, e.g. 0° C. and lower, for fine dispersions to be formed in the aliphatic hydrocarbon by dispersion polymerisation at such temperatures, dispersion polymerisation at higher temperatures, say, 70° C., results in coarse dispersions due to the polyvinyl acetate having at such a temperature a swelling factor of between 20% and 50%. In this case, however, a fine dispersion can be obtained by using in the "seed" stage polymethyl methacrylate as described above.

In the examples given above the organic liquid is essentially non-polar and the dispersed polymer is essentially polar. Applying the principle of this invention at the other end of the polarity scale, if the organic liquid is polar, the main polymer to be dispersed will be non-polar and if it is of borderline insolubility the "seed" stage polymer will need to be more non-polar than the main polymer so that it has a lower swelling factor.

For example, non-polar polymers such as polycetyl methacrylate and styrene/butadiene copolymers are sufficiently insoluble in polar liquids such as ethanol, methanol and mixtures with glycol, for dispersions to be formed in those liquids. However, in order to obtain fine, uniform dispersions by a dispersion polymerisation process more insoluble polymers should be used in the "seed" stage. In the case of polycetyl methacrylate a suitable "seed" polymer is polyacrylonitrile whose swelling factor is low because of the tendency towards crystallinity in its molecular structure. In the dispersion polymerisation process both the "seed" polymer and the main polymer particles can be stabilised by carrying out the polymerisation in the presence of a soluble copolymer of acrylic acid which has been reacted with a minor proportion of glycidyl methacrylate to introduce into each polyacrylic acid chain on average one methacrylic C=C. The modified copolymer, being soluble in the polar organic liquid, functions as a stabiliser precursor, the anchoring component being provided by grafting onto the precursor a minor proportion of the monomer being dispersion polymerised as described in co-pending application Ser. No. 290,243.

In the case of dispersions of styrene/butadiene copolymer in polar liquids, an extremely non-polar polymer such as polyethylene may be used in the "seed" stage to produce copolymer dispersions of fine, uniform particle size. In this case a suitable stabiliser for the polyethylene "seed" comprises a random copolymeric chain of ethylene with a minor proportion of glycidyl methacrylate (which copolymer provides the anchoring component) onto which has been grafted polymeric chains of vinyl pyrrolidone (which provides the solvated component of the stabiliser). In the main polymerisation of styrene and butadiene a stabiliser precursor such as polymethacrylic acid reacted with a minor proportion of glycidyl methacrylate may be used.

Following the above-described principal dispersions may be made of polymers derived from such ethylenically unsaturated monomers as acrylic and methacrylic acids, nitriles and amides of such acids and esters such as the methyl, ethyl, octyl, 2-ethyl hexyl, cetyl and lauryl esters, vinyl alcohol and derivatives such as chloride, acetate, chloracetate and stearate, vinylidene chloride, styrene and derivatives such as vinyl toluene, α-methyl styrene and divinyl benzene, butadiene, isoprene, ethylene and propylene. These are typical main monomers which may be copolymerised with others as listed above or with other monomers such as itaconic, crotonic and maleic acid and esters and allyl alcohol and esters.

Organic liquids in which dispersions of suitable polymers may be made include aliphatic and aromatic hydrocarbons, ketones, esters, ethers, alkanols and diols and mixtures of such liquids.

The invention is illustrated by the following examples in which all parts are by weight:

Example 1

A mixture of:

| | Parts |
|---|---|
| Aliphatic hydrocarbon (70–95° C.) | 344.0 |
| Aliphatic hydrocarbon (140–160° C.) | 86.0 |
| Methyl methacrylate | 14.7 |
| Methacrylic acid | 0.3 |
| Azodiisobutyronitrile | 1.0 |
| Stabiliser solution (26% solids) | 92.0 | was heated at reflux for 30 minutes after which time it had turned white due to the formation of very fine disperse particles of polymethyl methacrylate. These "seed" particles were $0.05\mu$ to $0.1\mu$ in diameter and were stabilised by the graft copolymer of lauryl methacrylate and methyl methacrylate of the stabiliser solution; the polylauryl methacrylate segment of the graft copolymer was solvated by the aliphatic hydrocarbon and was attached to the disperse polymer particles by the polymethyl methacrylate segment of the graft copolymer.

To the refluxing "seed" stage was added over three hours a mixture of:

| | Parts |
|---|---|
| Ethyl acrylate | 437.0 |
| Methacrylic acid | 23.0 |
| Azodiisobutyronitrile | 2.0 | after which refluxing was continued for a further half an hour.

The product was a stable dispersion of polymer particles of diameter about $0.3\mu$.

When the process was repeated replacing the methyl methacrylate in the "seed" stage by ethyl acrylate a dispersion was formed but the particles were coarse and irregular.

Example 2

A mixture of:

| | Parts |
|---|---|
| Methyl methacrylate | 24.4 |
| Methacrylic acid | 1.43 |
| Hexane | 70.0 |
| Aliphatic/aromatic hydrocarbon (155–195° C.) | 70.0 |
| Azodiisobutyronitrile | 0.33 |
| Stabiliser precursor solution | 14.33 | was refluxed for an hour by which time it had whitened due to the formation of fine disperse particles ($0.05$–$0.1\mu$ diameter). The particles were stabilised by graft copolymer formed by grafting a minor portion of the monomers onto the stabiliser precursor which was polylauryl methacrylate ($M_v$ 40,000) having a terminal unsaturated methacrylate group for copolymerisation with the monomer. This precursor was prepared by a process described in co-pending application Ser. No. 367,883.

A further 140 parts each of hexane and the above mixed hydrocarbon were added and to the refluxing mixture was fed over four hours a mixture of:

| | Parts |
|---|---|
| Vinyl acetate | 416.6 |
| Methacrylic acid | 8.4 |
| Azodiisobutyronitrile | 12.0 |

Refluxing was continued for a further hour and the product was a stable fine-particle dispersion containing about 48% of polymer particles of $0.3$–$0.5\mu$ diameter.

I claim:
1. A process of making a dispersion of polymer particles in an organic liquid comprising dispersion polymerising ethylenically unsaturated monomer in an organic liquid in which said polymer has a swelling factor of from 20% to 50% to form said polymer in the presence of seed particles of another polymer having a swelling factor in the organic liquid of less than 15%, the size of said seed particles being from $0.05\mu$ to $0.5\mu$ and the proportion of said seed particles being from 2% to 20% by weight of the total polymer of the resulting dispersion;
    the swelling factor of the polymers being the percentage increase in weight of the polymers when:
      (i) immersed in a mixture of the organic liquid with 10% by weight of the monomer from which the polymer is derived;
      (ii) the mixture of liquid and monomer being at the temperature at which the dispersion polymerisation is carried out; and
      (iii) the percentage increase in weight of the polymer being determined when equilibrium with the mixture has been reached.
2. A process as claimed in claim 1 in which the seed particles of polymer have a swelling factor of not more than 10%.
3. A dispersion of polymer particles in an organic liquid made by a process as claimed in claim 1.

References Cited

UNITED STATES PATENTS

| | | | |
|---|---|---|---|
| 3,095,388 | 6/1963 | Osmond et al. | |
| 3,198,759 | 8/1965 | Schmidle | 260—33.6 |
| 3,218,287 | 11/1965 | Schmidle et al. | 260—33.6 |
| 3,232,903 | 2/1966 | Schmidle et al. | 260—33.6 |
| 3,264,234 | 8/1966 | Osmond. | |

MORRIS LIEBMAN, *Primary Examiner.*

R. S. BARON, *Assistant Examiner.*